US008488512B2

(12) United States Patent
Guo et al.

(10) Patent No.: US 8,488,512 B2
(45) Date of Patent: Jul. 16, 2013

(54) RESOURCE SCHEDULING METHOD FOR MULTI-HOP RELAY WIRELESS NETWORK

(75) Inventors: Xin Guo, Beijing (CN); Wenchao Ma, Beijing (CN)

(73) Assignees: Lenovo (Beijing) Limited, Beijing (CN); Legend Holdings Ltd, Beijing (CN)

( * ) Notice: Subject to any disclaimer, the term of this patent is extended or adjusted under 35 U.S.C. 154(b) by 1208 days.

(21) Appl. No.: 12/163,279

(22) Filed: Jun. 27, 2008

(65) Prior Publication Data
US 2009/0003260 A1   Jan. 1, 2009

(30) Foreign Application Priority Data

Jun. 28, 2007   (CN) .......................... 2007 1 0118087

(51) Int. Cl.
*H04B 7/14*   (2006.01)
*H04J 1/10*   (2006.01)
*H04J 3/08*   (2006.01)
*H04W 4/00*   (2009.01)

(52) U.S. Cl.
USPC ............ 370/315; 370/328; 370/329; 370/341

(58) Field of Classification Search
USPC ........................................................ 370/315
See application file for complete search history.

(56) References Cited

U.S. PATENT DOCUMENTS

| 7,756,482 B2* | 7/2010 | Lin et al. ..................... 455/67.13 |
| 2006/0262750 A1* | 11/2006 | Walton et al. ................. 370/329 |
| 2007/0206500 A1* | 9/2007 | Mollah et al. ................. 370/235 |
| 2008/0123520 A1* | 5/2008 | Ji et al. ........................... 370/216 |

* cited by examiner

*Primary Examiner* — Faruk Hamza
*Assistant Examiner* — Diane Lo
(74) *Attorney, Agent, or Firm* — Dickstein Shapiro LLP (57) ABSTRACT

The present invention discloses a resource scheduling method for multi-hop relay wireless network comprising: for each of a base station and relay stations, acquiring the minimal resource requirement of each of connections to all MSSs which are covered by said station and have direct signal transmission with said station, and then summing up the acquired resource requirement to obtain the minimal resource requirement of said station; and acquiring interference status between the relay stations, using different partition strategies to classify the relay stations into different independent sets, each of which can occupy the same resource, according to the minimal resource requirement of the base station and the relay stations as well as the interference status between the relay stations, and determining and comparing the total resource requirement under each of the partition strategies to obtain an optimized partition strategy for resource reuse scheduling. This resource scheduling method can meet the QoS requirement on each connection better and is applicable to dynamic and asymmetric multi-hop network.

8 Claims, 6 Drawing Sheets

Fig.1 Prior Art

Coverage with direct connection to BS

Coverage with connection to RS

RESOURCE SCHEDULING METHOD FOR MULTI-HOP RELAY WIRELESS NETWORK

BACKGROUND OF THE INVENTION

1. Field of Invention

The present invention relates to a resource scheduling method for wireless network, and in particular to a resource scheduling method for multi-hop relay broadband wireless network.

2. Description of Prior Art

Broadband wireless communication technology and network have been in a rapid progress in the past few years, and these emerging wireless communication systems each have higher operating carrier frequencies due to the planning of frequency spectrum. The existing wireless access network architecture is basically a single-hop network composed of BS (Base Station) and MSS (Mobile Subscriber Station), and each MSS carries out network access directly served by a BS. Such single-hop network has difficulty in meeting the requirement of a high-frequency wireless communication system, since high-frequency signals are poor in transmittance and diffraction and thus vulnerable to Shadow Fading Effect caused by landform. Further, electromagnetic wave undergoes larger attenuation as the band becomes higher, thereby leading to a reduced coverage of base station. For example, according to the result of practical network planning, with a higher transmission frequency being employed, a base station of WiMAX (Worldwide Interoperability for Microwave Access) has an effective coverage radius of only about a few kilometers within urban district, and the effective data transmission rate decreases drastically as the distance between MSS and BS increases. In other words, BS of such high-frequency wireless communication system using single-hop network has a small coverage, and a user located on the edge of BS coverage cannot obtain the guarantee of higher data transmission rate and QoS (Quality of Service).

An approach to solve the above problems is repartitioning each coverage so that it is reduced to some extent that each BS can ensure a high QoS. In this way, the number of BSs must be expanded to bring respective regions into each coverage. This method is inconvenient in terms of the difficulty and cost of BS construction. Thus, for wireless communication network, the concept of multi-hop network is proposed, which forwards signals between BS and MSS by use of one or more tiers of Relay Stations (RSs). Since a node in the multi-hop network can reach its adjacent node with a lower transmitting power, the transmitting power of RS can be reduced dramatically. Besides, a plurality of RSs can be dispersed in terms of location, which helps to effectively avoid the influence of landform on network layout.

Unfortunately, it is necessary to relay duplicated data between BS and RSs in the multi-hop relay network, resulting in waste of system resource in terms of signal transmission time overhead or frequency occupation and thus a shrunk system capacity. For this reason, resource reuse technology is necessary. Here, resource can be time in a TDMA (Time Division Multiple Access) communication system, frequency bandwidth in a FDMA (Frequency Division Multiple Access) communication system, pseudo-random code in a CDMA (Code Division Multiple Access) communication system or any other type of resource in other multiple access multiplex communication systems. Different types of resource do not cause any variation in practical application. For the purpose of description, hereafter "resource requirement" represents the requirement quantity of a particular resource type in each of different multiple access multiplex communication systems, "resource scheduling" refers to the resource allocation of BS to respective RSs and MSSs directly coupled to the BS itself, and "resource reuse scheduling" means that BS allocates the same resource to different RSs.

Figure 1:
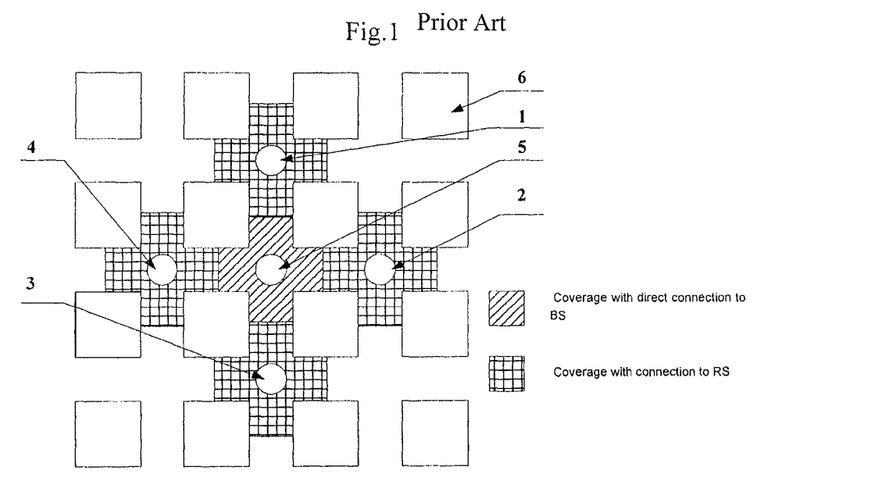
FIG. 1 is a topology diagram of the prior art multi-hop network.

FIG. 1 shows the current wireless network topology structure for resource reuse scheduling method in a wireless communication system. This scheme adopts Manhattan model, in which each cell has a symmetric network structure formed of one BS and four RSs, and the inter-cell network layout are identical in structure. As shown in FIG. 1, BS 5 is located among a group of buildings 6 and has 4 surrounding RSs of RS1, RS2, RS3 and RS4 with reference numbers of 1, 2, 3 and 4 respectively. With such architecture, no interference exists between RS1 and RS2 thanks to the blocking role of the buildings, and thus resource reuse scheduling can be applied for the two RSs. This is also true for RS3 and RS4.

Figure 2:
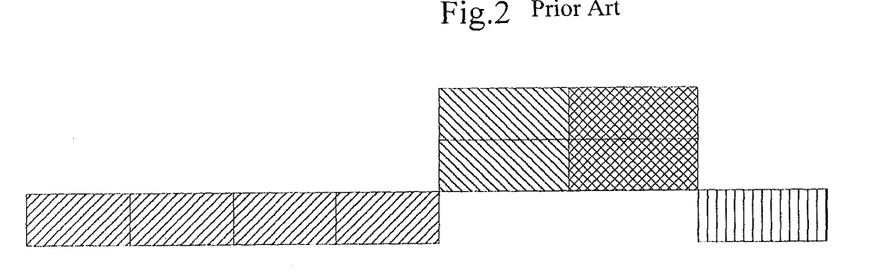
FIG. 2 shows the structure of a time frame in the prior art resource reuse scheduling.

Take the TDMA system as an example, one complete time frame in wireless communication has a structure as shown in FIG. 2. The area filled with left diagonals at the head of the time frame represents the time for which BS serves RS 1, 2, 3 and 4, respectively. The middle area filled with right diagonals represents the time for which RS1 and RS2 serve MSS simultaneously, and the middle area filled with squares represents the time for which RS3 and RS4 serve MSS simultaneously. The area filled with vertical lines at the end denotes the time for which BS serves MSS. With such resource reuse scheduling method, it is possible to shorten the length of time frame and conserve system resource.

Since the method gives no consideration to the variation in bandwidth requirement of these RSs, it allocates each RS with the same share of resources. During the simultaneous scheduling of the system on a series of RSs having no interference with each other, because of the difference in required time resource, the scheduling on some RSs has already been fulfilled, while the scheduling on some other RSs continues, and the scheduling on the next series of RSs cannot be started. Therefore, the waste of system resource remains, further leading to the influence on the bandwidth actually obtained by each MSS as well as the difficulty in meeting QoS requirement on each link. Furthermore, this resource scheduling method can be applied to only a RS arrangement of symmetric and fixed locations without taking into account the RS layout of asymmetry and mobility, and thus the application field is limited.

SUMMARY OF THE INVENTION

In view of the above problems, the object of the present invention is to provide a resource reuse scheduling method in multi-hop relay broadband wireless network, which can allocate resource to each RS according to its actual resource requirement and correspondingly realize resource reuse scheduling among RSs.

In order to achieve the above object, the present invention uses the following technical measures.

According to the invention, it provides a resource scheduling method for multi-hop relay wireless network. It comprises: A. for each of a base station and relay stations, acquiring minimal resource requirement of each of connections to all MSSs which are covered by said station and have direct signal transmission with said station, and then summing up the acquired resource requirement to obtain the minimal resource requirement of said station; B. acquiring interference status between the relay stations, using different partition strategies to classify the relay stations into different independent sets, each of which can occupy the same resource, according to the minimal resource requirement of the base station and the relay stations as well as the interference status between the relay stations, and determining and comparing the total resource requirement under each of the partition strategies to obtain an optimized partition strategy for resource reuse scheduling.

Preferably, the method, further comprises after said step B: C. calculating the value of residual resource between the resource which the wireless network can provide and the resource required by the optimized partition strategy for resource reuse scheduling, and comparing the value of residual resource with a preset threshold; D. allocating the residual resource if said value of residual resource is greater than the preset threshold.

Preferably, said minimal resource requirement of each of connections to all MSSs which are covered by said station and have direct signal transmission with said station is determined by Quality of Service requirement on these connections.

Preferably, at said step of partitioning the relay stations, the relay stations are classified into different connected components which have no interference with each other before the partition, and then the relay stations within each connected component are partitioned into different independent sets so that different partition strategies are used to partition the relay stations within each connected component.

Preferably, the method further comprises after said step D: if the total resource requirement required by the last partition result is not the minimum among the partition strategies after the allocation of the residual resource, repeating said steps A to D until the final value of residual resource is lower than the preset threshold and then terminating the allocation of the residual resource.

Preferably, the method further comprises: repeating said steps A to B cyclically at a specified time length.

Preferably, the method further comprises: repeating said steps A to D cyclically at a specified time period.

The resource reuse scheduling method in multi-hop relay broadband wireless network provided by the present invention can allocate resource to each RS according to its actual resource requirement and thus has advantages as follows.

First, the scheduling result is determined by use of interference among BS and RSs and resource requirement measured dynamically in the operation of the network, with no need for learning the network topology or interference in advance.

Therefore, this scheduling method is applicable to RS arrangements of both symmetric, fixed location and asymmetric, mobile location. Meanwhile, it can also make real time responses to change in interference between RSs caused by various factor, such as power control and weather.

Second, the QoS requirement of each link can be better satisfied since the resource is scheduled according to the actual bandwidth requirement of each of BSs and RSs. Thanks to the consideration of variation in requirement of different RSs, the bandwidth resource can be put into a better use, resulting in an expanded system capacity. The system capacity can be further improved with respect to the scheduling in unit of link.

DETAILED DESCRIPTION OF PREFERRED EMBODIMENTS

Now, the present invention will be elaborated with respect to the figures and particular embodiments.

Figure 3:
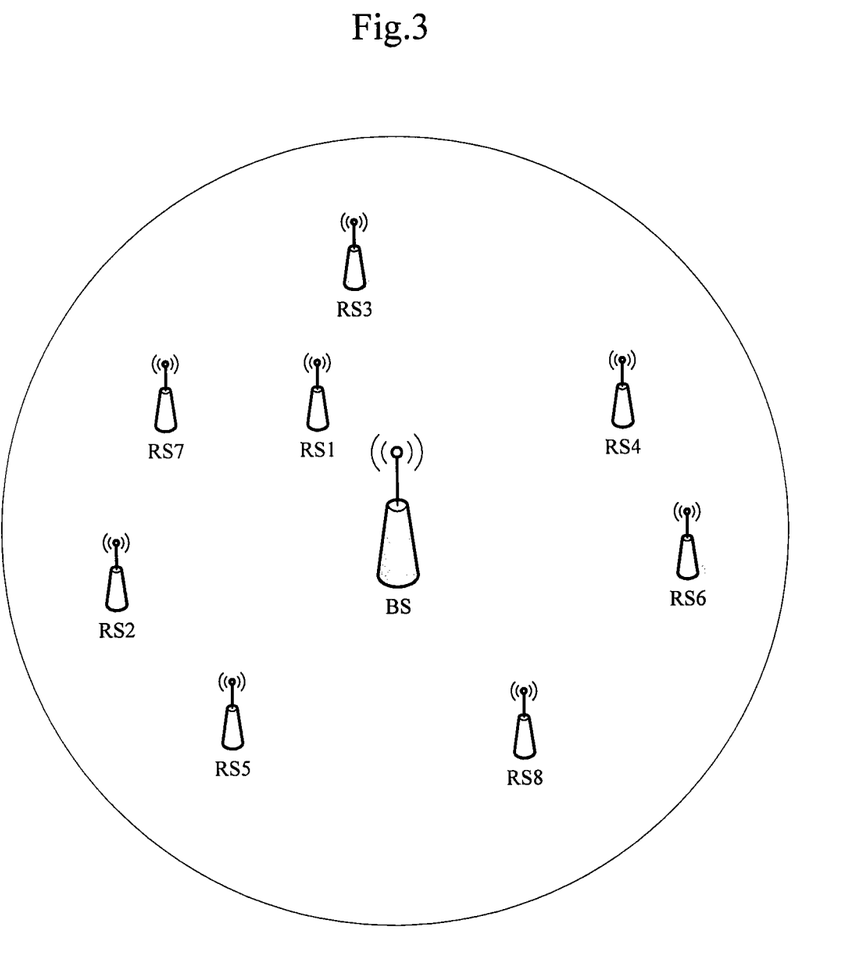
FIG. 3 a topology diagram of a multi-hop network to which the present invention can be applied.

The present invention is applicable to the planning of asymmetric and mobile RS location. FIG. 3 shows a wireless communication network topology. In the aspect of signal transmission object, a multi-hop relay network can be divided into four types of signal transmission links, i.e., BS<->RS, RS<->RS, BS<->MSS and RS<->MSS. All BS<->MSS links between a BS and all MSSs within its coverage can be regarded as a whole and scheduled in unit of BS. Similarly, all RS<->MSS links between each RS and all MSSs within its coverage can also be regarded as a whole and scheduled in unit of RS. Thus, an adaptive reuse scheduling will be carried out in unit of BS or RS to simplify the following description, and no MSS is shown in FIG. 3.

Figure 4:
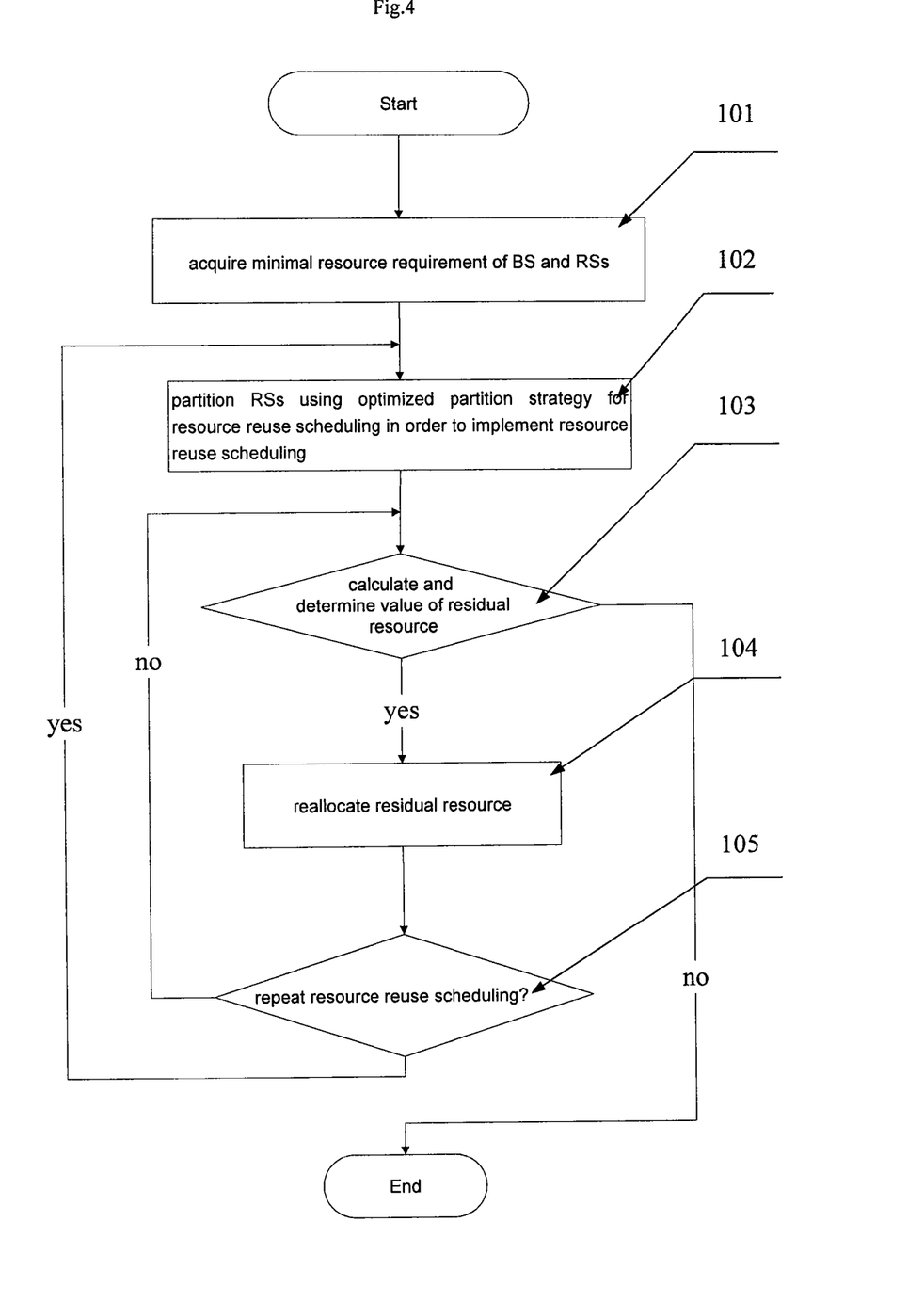
FIG. 4 is a flowchart of the resource reuse scheduling method used in present invention.

As shown in FIG. 4, the resource reuse scheduling method in multi-hop relay broadband wireless network consists in the following steps according to the present invention.

(101) Acquiring the Minimal Resource Requirement of BS and Each RS: acquiring the minimal resource requirement of each of connections to all MSSs which are covered by BS and each RSs and have direct signal transmission with them, and then sum up the acquired resource requirement to obtain the minimal resource requirement of BS and each RS.

Services supported by the broadband wireless network generally include multiple service types of different QoS requirement, the resource requirement of each type is usually represented by two critical QoS parameters, maximal and minimal data transmission rates. The resource requirement of respective connections varies with the different types of services on these connections. By summing up the resource requirement of QoS requirement corresponding to the minimal resource requirement required by each of connections to all MSSs which are covered by BS and each RSs and have direct signal transmission with them at certain moment, the minimal resource requirement needed by BS and each RS at this moment can be obtained during the scheduling in unit of either BS or RS.

(102) Partitioning All the RSs by Use of Optimized Partition Strategies for Resource Reuse Scheduling to Implement Such Scheduling: acquiring interference statuses between respective RSs, and then partitioning all the RSs by use of different partition strategies based on the minimal resource requirement of BS and each RS as well as the interference statuses between RSs. In fact, these partition strategies classify all the RSs into different independent sets, each of which can occupy common resource, in different manners. For example, RSs 1 and 2 can be classified into the same independent set and share the same resource, RSs 3 and 5 can belong to the same independent set and share the same resource, while RS 7 itself forms an independent set. This is called a partition strategy. Each of the partition strategies for resource reuse scheduling are optimized by deciding and comparing the overall resource requirement under this partition strategy.

Figure 5:
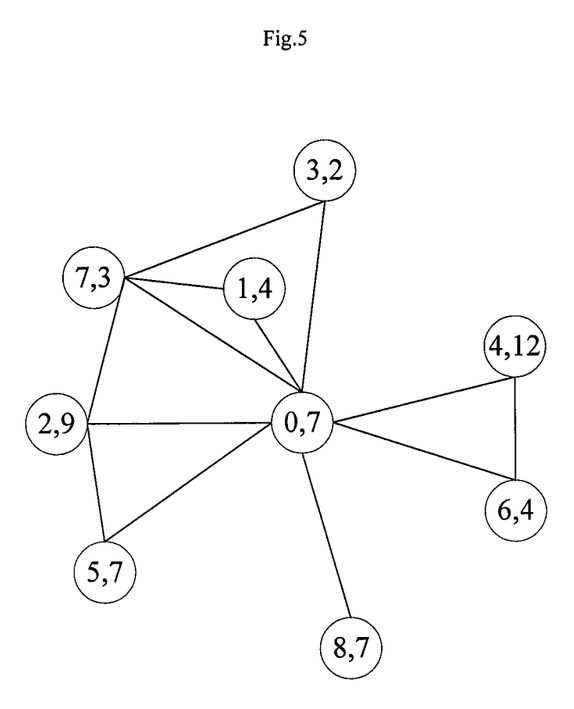
FIG. 5 is a vertex weighted graph transformed from FIG. 3.

Such step can be defined as a resource reuse partition step, in which various optimization approaches can be adopted to obtain optimized partition strategies for resource reuse scheduling. Here, an instance is such that, as shown in FIG. 5, a vertex weighted graph G(V,E,W) is used to represent the interference between RSs and the resource requirement of both BS and RSs. In FIG. 5, each vertex corresponds to one of BS and RSs in FIG. 3, the weight of this vertex corresponds to the resource requirement obtained at step (101), and each edge indicates that communication signals imposes severe interference with each other when the two vertexes connected via this edge use the same resource with respect to MSSs located on the borders of their coverage areas, for example, using electromagnetic wave on the same frequency band at adjacent RSs will result in mutual interference.

In FIG. 5, each circle represents a vertex, the first numeral in the circle stands for the number of the vertex, such as 0 for BS, and 1 for RS1, and the second numeral in the circle indicates the bandwidth requirement of the vertex. In this way, Vertex (0,7) represents that this is BS and the resource requirement corresponding to the QoS requirement of MSSs connected directly to this BS is 7.

Interference can be attributed to various factors, such as distance between BS and RSs, landform, power control strategy. Many approaches can be used to deciding the level of interference, for example, the decision can be made by setting an interference intensity threshold IIth. More specifically, the interference measured between two vertexes can be referred to as Interference Intensity, and there exists serious interference between the two vertexes if the interference intensity exceeds IIth, and such serious interference is shown as an edge connecting the two vertexes in FIG. 5. For instance, the edges between the vertexes (7,3) and (1,4), (3,2) and (2,9) indicate that there is interference between RS7 and RS1, RS3 and RS2, respectively. As far as resource reuse scheduling is concerned, vertexes connected via an edge cannot occupy the same resource. Besides, the BS vertex (0,7) has multiple edges connecting each of these RSs since BS is responsible for the resource scheduling of all the RSs.

The mathematic model based on the quantification relation between interference status, resource requirement and a reuse scheduling result can be described as a vertex weighted graph G(V,E,W), where V stands for vertex domain, E for edge domain, and W for weight domain. The weight of each vertex is w(v), w∈W, v∈V. A partition of this graph can be obtained through the two substeps as follows:

(1) partitioning the graph into a plurality of connected components B1, B2 ..., Bm in accordance with the connectivity of FIG. 5 such that only the BS vertex is public among these connected components, no interference exists between different connected components, and thus they can use the same frequency spectrum resource at the same time;

(2) further partitioning each connected components into a plurality of reuse scheduling sets, since there is interference within the connected component, and the member BS, RSs and the covered MSSs cannot use the same resource simultaneously in data transmission. Identical resource can be used within any reuse scheduling set at the same time, while different reuse scheduling sets cannot use the same resource simultaneously unless the use of resource is arranged at different moments or frequency bands. Each reuse scheduling set can be created by coloring the vertexes within a connected component normally to obtain a sequence of independent sets S1, S2, ..., Sn, each of them corresponding to a reuse scheduling set.

The weight of each independent set is defined as the maximum among the weights of its member vertexes, i.e., W(sj)= max{w(u)|u∈Sj}, j∈[1,n], Sj represents the jth independent set, u is one of the member vertexes in this set, w(u) is the weight of this vertex, and W(Sj) is the maximum among the weights of all the vertexes in this set. The weight of each connected component is defined as the sum of the weights of all the member independent sets in this component, i.e., W(Bi)=ΣW(Sj), j∈[1,n], i∈[1,m]. Bi represents the ith connected component containing n independent sets S1, S2, ..., Sn, Sj represents the jth independent set, and W(Bi) is the sum of the weights W(Sj) of all the independent sets in the ith connected component and thus the weight of this component. The weight of each partition strategy is defined as the maximum among the weights of all the connected components, i.e., W(P)=max{W(Bi)}, i∈[1,m]. Here, P represents a type of partition strategy including m connected components B1, B2, ..., Bm, W(Bi) is the weight of the ith connected component. The optimum scheduling goal is to find a partition strategy P having the smallest weight W(P)= min for the vertex weighted graph G(V,E,W).

Figure 6:
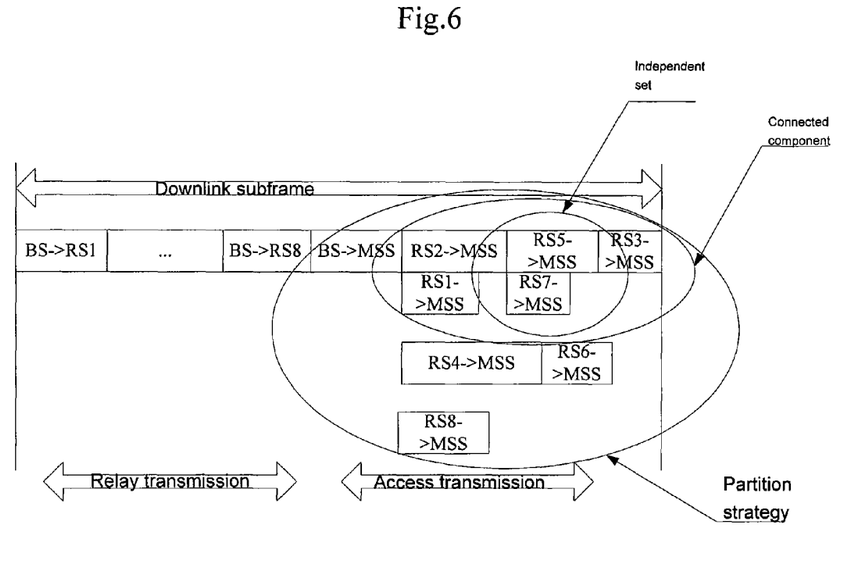
FIG. 6 shows a reuse scheduling result of a downlink subframe in the communication network of the present invention.

The optimization of partition strategy can be conducted with various mathematic algorithms. As an example, all possible partition strategies are first listed, and then weights corresponding to these strategies are calculated and compared. Alternatively, an approximation algorithm like Greedy algorithm can be used to acquire the minimal weight for each partition strategy more rapidly. FIG. 6 shows the structure of a downlink subframe corresponding to one type of partition strategy for the communication network in FIG. 3. As can be seen in connection with the vertex weighted graph of FIG. 5, the partition strategy in FIG. 6 is that vertexes (7,3), (1,4), (3,2), (2,9) and (5,7) form one connected component, vertexes (4,12) and (6,4) form another connected component, and vertex (8,7) forms still another connected component. For the first connected component, the vertexes (1,4) and (2,9) are selected to form an independent set since there is no edge connecting the two vertexes, and thus resource multiple scheduling can be applied to RSs corresponding to the two vertexes. Similarly, the vertexes (5,7) and (7,3) are selected to form another independent set. For the other two connected components, only individual scheduling can be conducted within each of them. Take TDMA system as an example, the last time frame comprises the time BS serves RSs, the time BS serves MSSs directly connected to itself, and the time RSs undergo resource reuse scheduling. Respective connected components can serve their connected MSSs at the same time, RS1 and RS2 can serve their connected MSSs at the same time, RS5 and RS7 can also serve their connected MSSs at the same time, and then RS3 serves its connected MSSs.

For an uplink subframe, the above procedure is the same except that the order needs to be inverted for the two stages of relay transmission between BS and RS as well as access transmission between RS and MSS.

During the above resource reuse scheduling, the network is first partitioned into several different connected components, and then each connected component is further partitioned so that different RSs within the component can occupy the same resource. The present invention also includes performing resource reuse schedule directly on all RSs in the entire network. In this case, the optimization method needs to be modified accordingly, that is, classifying all RSs into different independent sets and then calculating an optimized result.

(103) Calculating and Determining the Value of Residual Resource: calculating the value of residual resource between the total resource provided by the wireless network and the resource required by the optimized partition strategy for resource reuse schedule, and comparing the value of residual resource and a preset threshold.

An optimized reuse schedule result is obtained through the resource reuse partitioning step of (102). The residual resource R is the difference between the total resource the system can provide and the sum of resources required by uplink and downlink corresponding to the result.

(104) Reallocating the Residual Resource: if the value of the above residual resource is larger than the preset threshold, reallocating the residual resource in order to make full use of the system resource.

Figure 7:
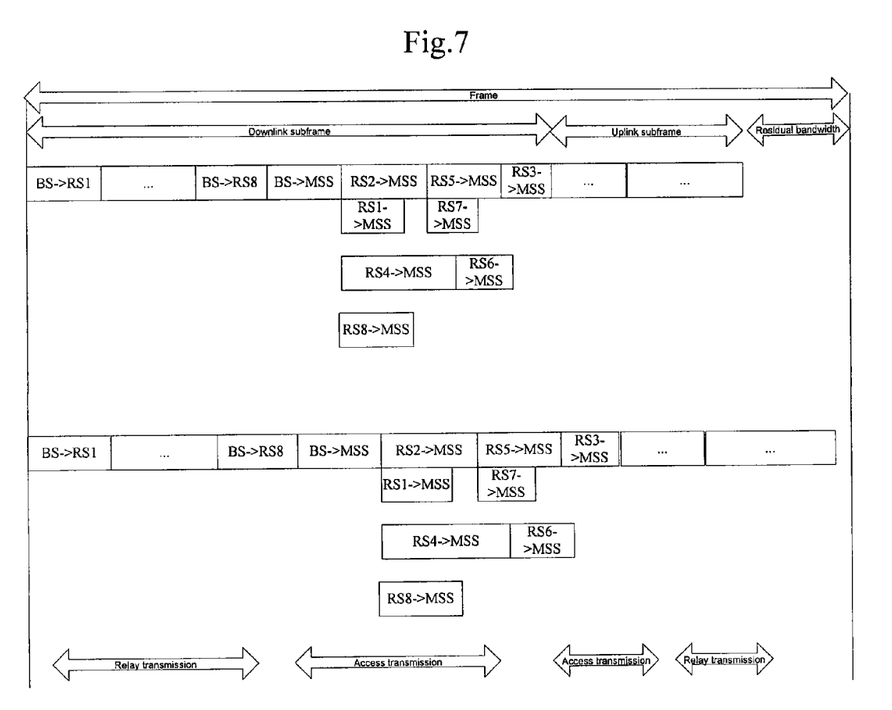
FIG. 7 shows the contrast between the structures of downlink subframe in the communication network before and after the reallocation of residual resource in the present invention.

If the residual resource R in the system exceeds certain preset threshold Rth, it is determined that plenty of residual resource can be reallocated, and thus such resource can be allocated to respective RSs. This allocation can be conducted in many ways, such as average allocation, service-requirement-based allocation, etc. Here, one way of reallocating residual resource is illustrated, in which half of the residual resource, R/2, is extracted for allocation, R/4 being allocated on the relay links of an uplink subframe, and the other R/4 being allocation on the relay links of a downlink subframe. The reason for such allocation is that, by taking downlink as an example, when resource R/4 has been allocated to the relay links, the resource needed by the access links increases accordingly since the transmitted contents are the same; while the added bandwidth will not exceed R/4 thanks to the resource reuse on the access links, and the residual bandwidth consumed by the uplink subframe will not exceed R/2; similarly, the residual bandwidth consumed by the downlink subframe will not exceed R/2; thus, it is ensured that the reallocated residual bandwidth will not be greater than R. Further, the allocation is perform in such order that the requirement of any realtime rate-variable service is first satisfied as much as possible according to delay conditions, the requirement of any non-realtime rate-variable service is then fulfilled if the residual resource is not run out, and finally other services are considered. FIG. 7 shows the contrast between the structures of time frame before and after the reallocation of residual resource, and the lower part of the figure represents the result after one reallocation of residual resource, in which it is likely to extend the time of service from BS to RS, the time of service from BS to its connected MSSs and the time of service from RSs to their connected MSSs.

(105) Repeating the Above Resource Reuse Scheduling: determining whether the reuse scheduling needs to be performed again.

The reallocation of residual resource may cause changes in sorting the weights of respective connected components, independent sets and vertexes. If such changes make the partition strategy obtained in (102) not the optimal result of resource reuse scheduling any more, that is, the total resource requirement needed by the original partition result is not the minimum among respective partition strategies any more, the steps of partitioning reuse resource and reallocating residual resource need to be conducted again. If the optimality of the original partition result holds, the allocation of residual resource continues until the final leftover resource is lower than the threshold Rth, and then the reallocation is terminated.

In order to realize a dynamic resource reuse scheduling of network resource, the above embodiment can further comprises the step of repeating steps (101) to (105) cyclically at certain time period.

The resource requirement status of wireless network keeps changing dynamically, the locations of MSSs or even RSs also vary, and some random factors, such as weather, may cause the interference between RSs to make realtime change responsively. Therefore, it is necessary to repeat the resource reuse scheduling at interval of certain time so that the status of resource reuse scheduling can vary dynamically with the resource requirement status and the interference between RSs.

In the method of the above preferred embodiment, it is assumed that all the RSs are connected to BS directly, and what plays a dominant role is that the reuse can be applied to the data transmission between RSs and MSSs. In fact, thanks to the influence from geographic environment, power control and the application of advanced antenna technology, the possibility to use reuse scheduling (using the same frequency resource simultaneously) also exists on the four types of links, BS<->RS, RS<->RS, BS<->MSS and RS<->MSS, in the multi-hop relay network. Accordingly, the method of the above embodiment can be modified. For example, a vertex weighted graph G(V,E,W) is used to represent the interference between respective links and bandwidth requirement, each vertex in the graph denotes a link having the requirement of signal transmission, such as any one type of the links BS<->RS, RS<->RS, BS<->MSS and RS<->MSS, the weight of each vertex corresponds to the bandwidth requirement of this link, and each edge indicates that serious interference will occur if the two vertexes connected by the edge transmit signals at the same frequency simultaneously. With such modification, the resource reuse scheduling method of the above embodiment can enable an efficient and comprehensive resource reuse scheduling on all links in the multi-hop relay network.

The above resource reuse scheduling method can be further extended. First, the vertexes of the vertex weighted graph G(V,E,W) may not be defined in the same scale. For example, during the adaptive reuse scheduling in unit of link in Relay network, if one of the RSs in the network layout is isolated from other RSs due to same factors, such as landform, and thus no interference occurs on data transmission, all the links within the coverage of this isolated RS can be regarded as one vertex and scheduled with respect to other links so as to reduce the complexity of scheduling. Next, the formation of an edge can result from the comprehensive consideration of various factors that disable a simultaneous scheduling. Each edge can be assigned with a weight indicating the interference intensity between two vertexes, and this can be used as a determination condition in partitioning independent set, for example, it can be required that the sum of all edge weights within one independent set must not exceed certain threshold so as to reduce the interference in this independent set. Finally, each vertex may not have only one variable as its weight. Instead, the weight can be extended to multiple QoS parameters, such as delay, jitter, etc., which can be used as a determination condition in partitioning independent set. For example, it can be required that respective members within one independent set must stagger the degree of jitter to ensure a stable traffic flow. The above extension enables the resource reuse scheduling method to be applied to a wider field with better performance. With the above extension, the resource reuse scheduling method can be suitable for scheduling in various multi-hop wireless networks including Ad Hoc, Wireless Mesh, Wireless Sensor Network and the like.

The foregoing description illustrates merely the preferred embodiments of the present invention and has no intention of limiting the scope of the present invention. Those skilled in the art should envisage that, with different wireless communication networks as the application background of the present invention, the efficient resource reuse scheduling by using different optimization methods to obtain an optimal partition, the resource reuse scheduling in the context of hybrid single-hop and multi-hop networks and the resource reuse scheduling associated with more practical requirement in multi-hop networks should fall into the scope of the present invention.

What is claimed is:

1. A resource scheduling method for multi-hop relay wireless network comprising:
   A. for each of a base station and relay stations, acquiring minimal resource requirement of each of connections to all Mobile Subscriber Stations (MSSs) which are covered by the base station and each of the relay stations and have direct signal transmission with the base station and each of the relay stations, and then summing up an acquired minimal resource requirement to obtain the minimal resource requirement of the base station and each of the relay stations;
   B. acquiring interference status between the relay stations, using different partition strategies to classify the relay stations into different independent sets, each of which can occupy the same resource, according to the minimal resource requirement of the base station and each of the relay stations as well as the interference status between the relay stations, and determining and comparing the total resource requirement under each of the partition strategies to obtain an optimized partition strategy for resource reuse scheduling.

2. The resource scheduling method for multi-hop relay wireless network of claim 1, further comprising after said step B:
   C. calculating the value of residual resource between the resource which the wireless network can provide and the resource required by the optimized partition strategy for resource reuse scheduling, and comparing the value of residual resource with a preset threshold;
   D. allocating the residual resource if said value of residual resource is greater than the preset threshold.

3. The resource scheduling method for multi-hop relay wireless network of claim 2, further comprising after said step D:

if the total resource requirement required by the last partition result is not the minimum among the partition strategies after the allocation of the residual resource, repeating said steps A to D until the final value of residual resource is lower than the preset threshold and then terminating the allocation of the residual resource.

4. The resource scheduling method for multi-hop relay wireless network of claim 3, further comprising:
   repeating said steps A to D cyclically at a specified time period.

5. The resource scheduling method for multi-hop relay wireless network of claim 2, wherein at said step of partitioning the relay stations, the relay stations are classified into different connected components which have no interference with each other before the partition, and then the relay stations within each connected component are partitioned into different independent sets so that different partition strategies are used to partition the relay stations within each connected component.

6. The resource scheduling method for multi-hop relay wireless network of claim 1, wherein said minimal resource requirement of each of connections to all MSSs which are covered by the base station and each of the relay stations and have direct signal transmission with the base station and each of the relay stations is determined by Quality of Service requirement on these connections.

7. The resource scheduling method for multi-hop relay wireless network of claim 1, wherein at said step of partitioning the relay stations, the relay stations are classified into different connected components which have no interference with each other before the partition, and then the relay stations within each connected component are partitioned into different independent sets so that different partition strategies are used to partition the relay stations within each connected component.

8. The resource scheduling method for multi-hop relay wireless network of claim 7, further comprising:
   repeating said steps A to B cyclically at a specified time length.

* * * * *